June 23, 1964 J. MAURUSHAT, JR., ETAL 3,138,670

AUTOMATIC TEST EQUIPMENT FOR MULTI-TERMINAL COMMUNICATION SYSTEMS

Filed Aug. 29, 1961

5 Sheets-Sheet 1

INVENTORS J. MAURUSHAT, JR.
N. A. NEWELL

BY R. C. Winter

ATTORNEY

INVENTORS: J. MAURUSHAT, JR.
N. A. NEWELL
BY
R. C. Winter
ATTORNEY

INVENTORS: J. MAURUSHAT, JR.
N. A. NEWELL
BY
R. C. Winter
ATTORNEY

INVENTORS J. MAURUSHAT, JR.
N. A. NEWELL
BY
R. C. Winter
ATTORNEY

| | |
|---|---|
| FIG. 1 | FIG. 3 |
| FIG. 2 | FIG. 4 |

INVENTORS J. MAURUSHAT, JR.
N. A. NEWELL
BY
R. C. Winter
ATTORNEY

United States Patent Office 3,138,670

Patented June 23, 1964

3,138,670

AUTOMATIC TEST EQUIPMENT FOR MULTI-TERMINAL COMMUNICATION SYSTEMS

Joseph Maurushat, Jr., and Norman A. Newell, Millburn, N.J., assignors to Bell Telephone Laboratories, Incorporated, New York, N.Y., a corporation of New York Filed Aug. 29, 1961, Ser. No. 134,683

18 Claims. (Cl. 179—175.3)

Figure 1:
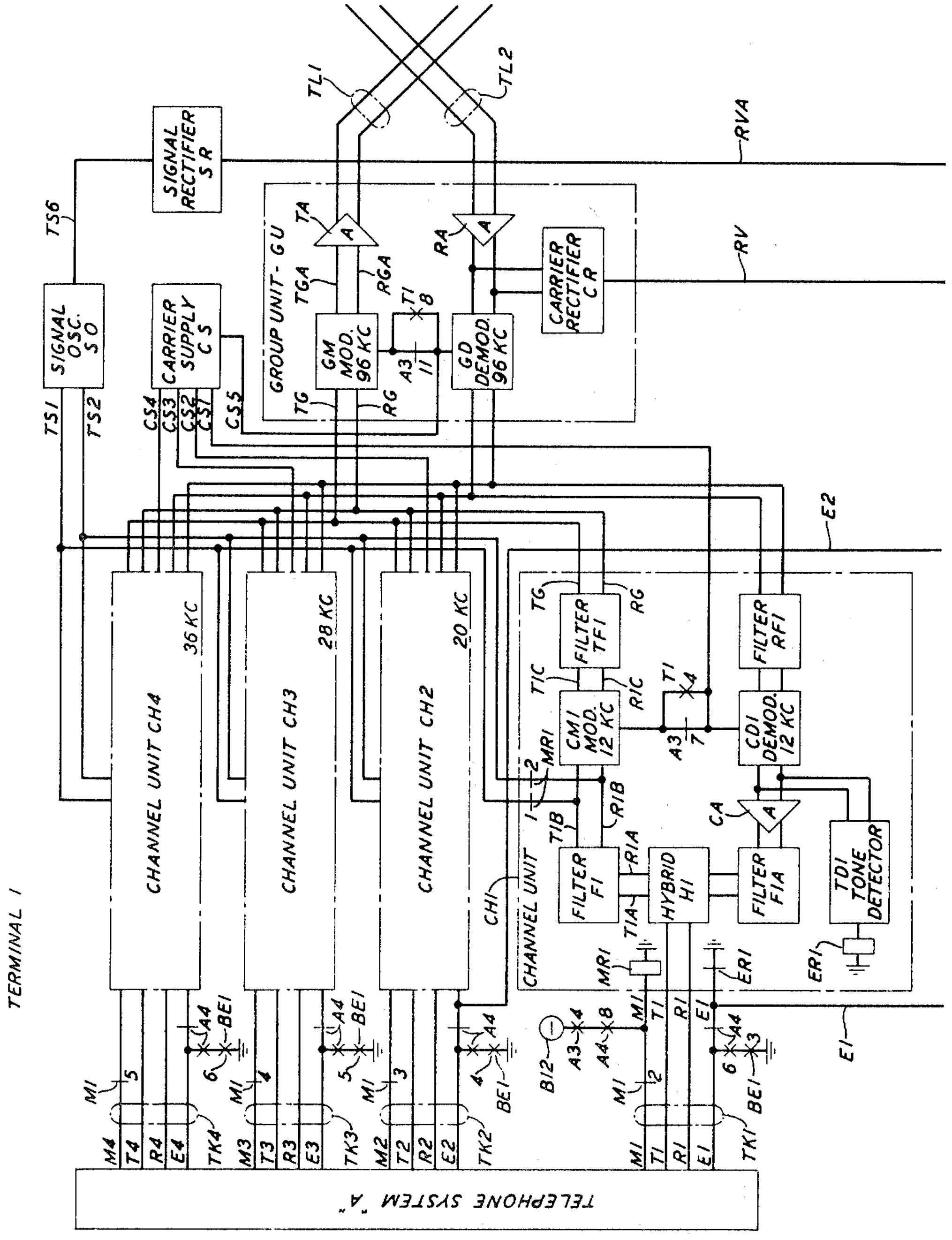

This invention relates to automatic testing systems and particularly relates to test equipment for multi-terminal communication systems. The invention more particularly relates to automatic equipment, which is provided at each system terminal, for testing concurrently the transmission in each direction between terminals after the system has been removed from service due to a trouble, and for returning it to service with minimum delay following the correction of the trouble.

Equipment is customarily used in a communication system, such as a carrier system, to remove it from service after a trouble arises that adversely affects service. Automatic facilities are also often employed in such a system to test sequentially the transmission in each direction between terminals to check for the correction of the trouble and then, after it is corrected, to return the system to service.

Although the testing arrangements provided at the present time for such systems are technically reliable, they require a considerable amount of time to complete the sequential tests. As a result, objectionable delay is encountered between the correction of the trouble and the restoration of the system to service. Thus, it is desirable to provide equipment for minimizing this delay and thereby for reducing the outage time of the system.

One system wherein sequential transmission testing is required is that described in U.S. Patent 2,986,610 granted to J. Maurushat, Jr. on May 30, 1961. In a system as disclosed in that patent, equipment is provided in a control terminal of a carrier system for initiating the transmission of test signals to a remote terminal after the system is removed from service. These signals are checked when they are received at the remote terminal, and thereafter test signals are transmitted back to the control terminal. After the latter signals are satisfactorily received, other signals are sequentially exchanged between the terminals for causing the system to be returned to service.

In such a system, valuable time is consumed by conducting the transmission tests sequentially in each direction between the terminals. Also, the testing must be controlled from one terminal. Consequently, if a trouble occurs which impairs transmission from that terminal, the test signals are not satisfactorily received at the remote terminal and further testing must be delayed until satisfactory transmission is re-established. No facilities are provided to test, during this delay period, the transmission in the other direction which is not impaired. Since the latter test must be conducted in such cases after the trouble correction, the restoration of the system to service is delayed. Obviously, such delays are costly and amount to a considerable portion of the total outage time of the system. In addition, the aforementioned test system is susceptible to erroneous operation because of noise and other spurious signals which are received during a test interval. These signals can simulate valid test signals and thereby cause the system to be restored to service while transmission is actually impaired.

In view of the foregoing, an object of this invention is to minimize the time that communication systems are out-of-service due to troubles.

Another object is to improve the testing procedures for multi-terminal communication systems in order to reduce the outage time of such systems. Thus, it is another object to provide testing equipment which is rapid and reliable in operation, and economical in construction.

A further object related to the immediately previous one is to provide facilities in the test equipment for returning the system to service with minimum delay after the correction of a trouble.

These and other objects are attained in accordance with an exemplary embodiment of the invention wherein equipment is provided at each terminal of a two-terminal carrier system for independently initiating the concurrent transmission of test signals in each direction between the terminals after the system has been removed from service due to a trouble which affects normal communications in one direction over all channels of the system. This equipment minimizes the time required for the transmission tests and for restoring the system to service, by testing the transmission in the direction not affected by the trouble immediately after the system is removed from service, and by conducting the transmission test in the affected direction as soon as the trouble is cleared. When the latter occurs and the test signals have been satisfactorily received at both terminals, circuitry in the test equipment at each terminal causes signals ot be transmitted between the terminals to restore the system to service.

It is a feature of our invention that transmission tests between two terminals of a communication system be conducted by equipment at each terminal which operates independently to initiate the concurrent transmisson of test signals in each direction between the terminals whenever an alarm condition occurs due to a deviation in the character of the normal signal transmission between the terminals, and by equipment which responds to the satisfactory reception of the test signals by cancelling the alarm condition.

Another feature is that the equipment at each terminal include circuitry for transmitting communication signals and circuitry for detecting a degradation in the character of transmitted communication signals as well as circuitry for detecting a degradation in the character of received communication signals.

Another feature is that the equipment as each terminal include circuitry for interrupting communications between the terminals when transmitted communication signals deviate from a predetermined characteristic, circuitry controlled by the interrupting means for initiating the concurrent transmission of test signals in each direction between the terminals, and circuitry responsive to the satisfactory reception of the test signals for effecting the restoration of normal communications between the terminals.

Another feature is that the interrupting circuitry at each terminal includes apparatus for detecting the signal deviation, apparatus for timing its period, apparatus for interrupting the communications when the period of the deviation exceeds a prescribed timing interval, and apparatus for controlling the test signal transmitting circuitry to initiate the concurrent transmission of test signals.

It is also a feature that the test signal transmitting circuitry at each terminal includes apparatus for generating a timed interval against which the period of the aforementioned interruption is measured, and apparatus for effecting the transmission of test signals to the other terminal immediately after the interruption exceeds the timed interval.

A further feature is that the restoring circuitry at each terminal includes apparatus for checking the validity of each of the received test signals, and apparatus for transmitting signals to the other terminal to restore normal communications after valid test signals have been satisfactorily received.

A clear and complete understanding of the invention will be obtained by considering the system embodying the invention as represented in the six figures of the drawing. The invention is not, however, to be considered in any way limited in its application to the particular system illustrated in the drawing for it is generally applicable to any communication system. The figures of the drawing represent in block and schematic form the two terminals of a two-way multi-channel carrier system for telephone use which embodies the invention. Four carrier channels of 8-kilocycles band-width each are utilized. The transmission of telephone voice and supervisory signals in each channel is by the conventional double sideband technique.

Figure 2:
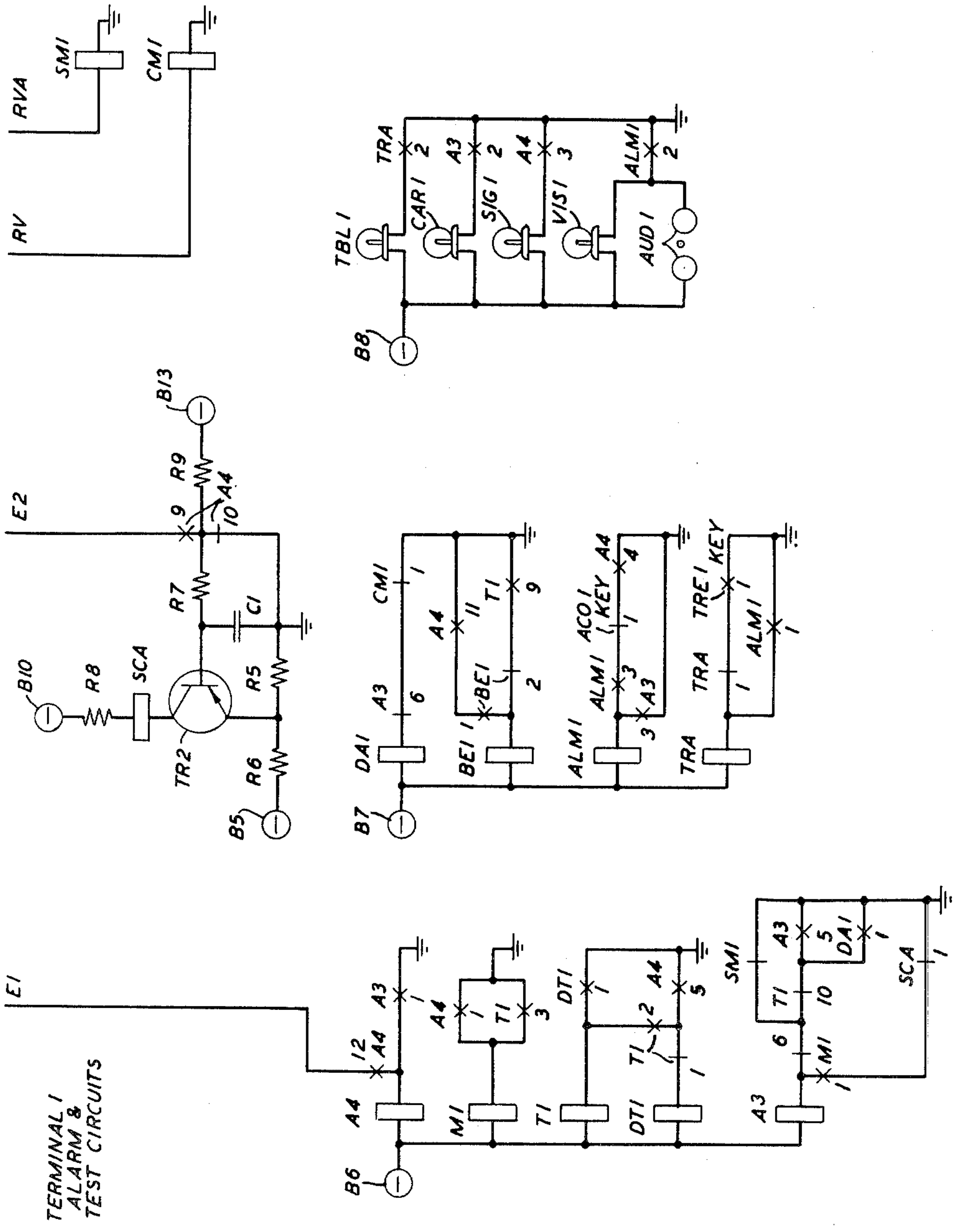
Figure 3:
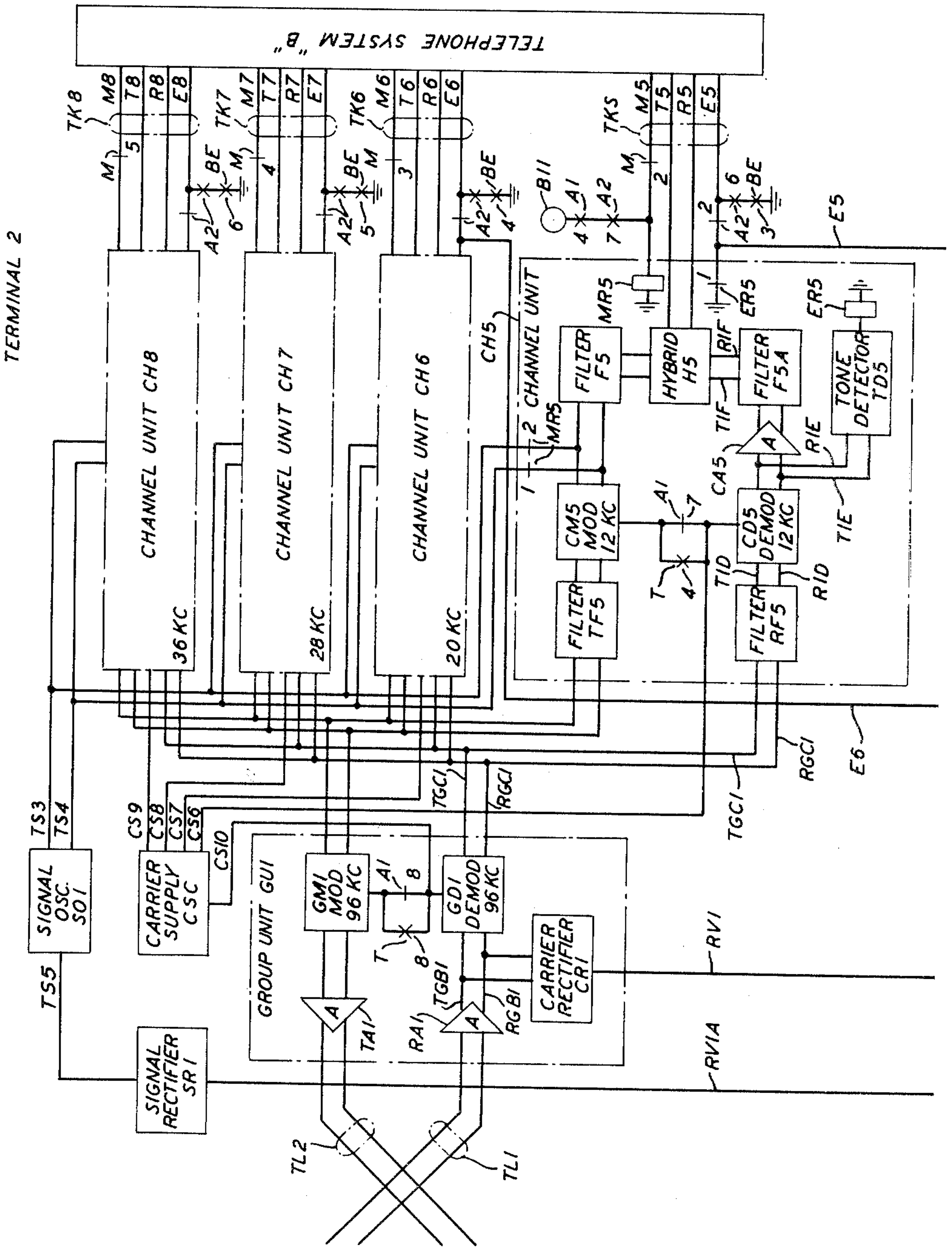
Figure 4:
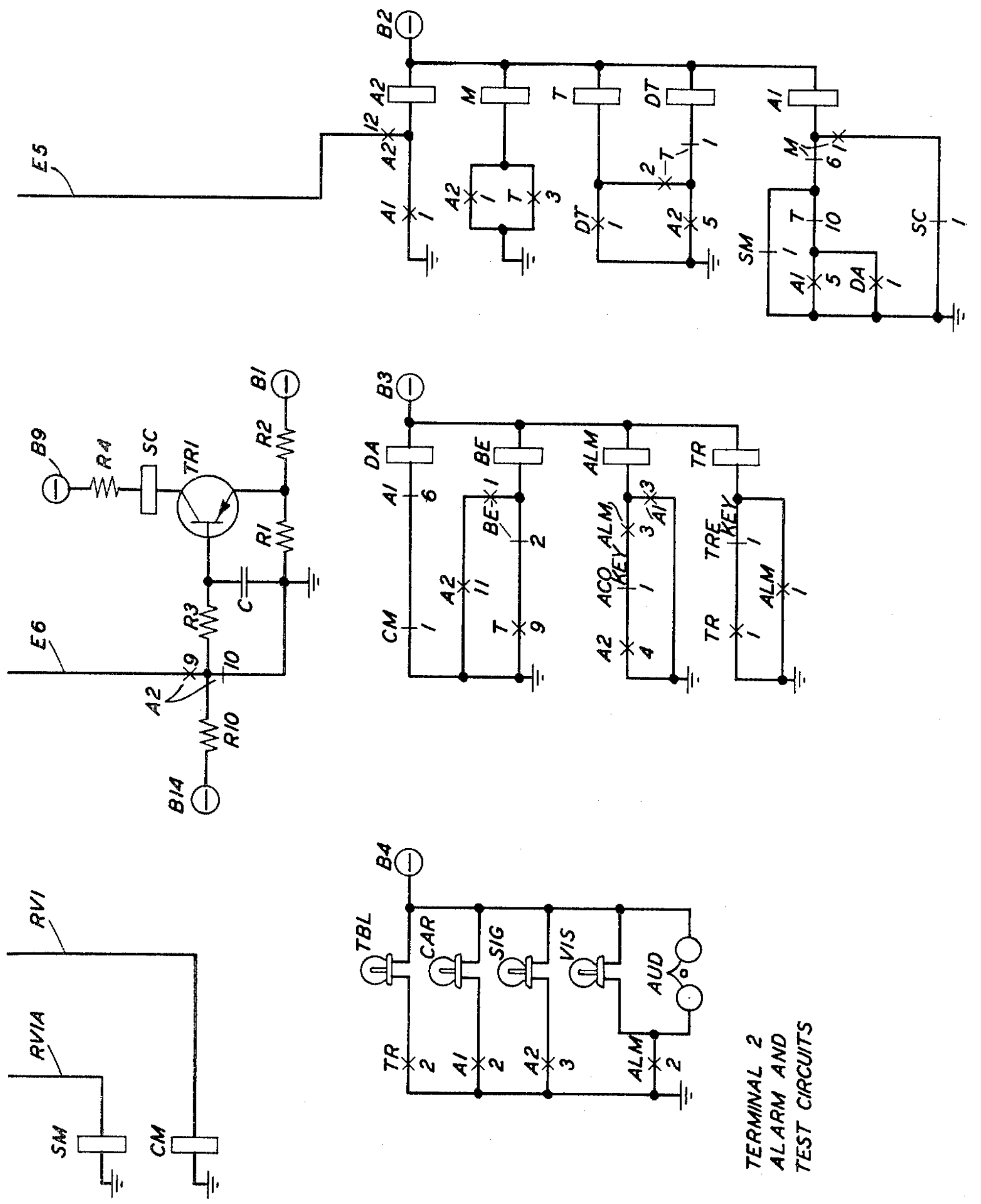
Figures 5, 6:
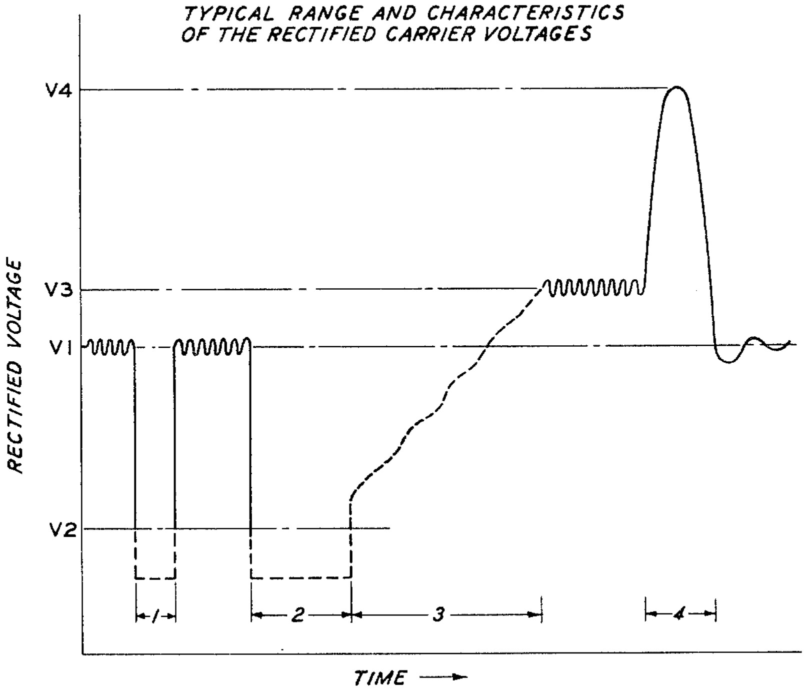

Referring to the figures of the drawing:

FIG. 1 illustrates in block and schematic form part of the terminal 1 equipment. It shows the telephone system A associated with the carrier system for a number of 4-wire trunks TK1–4. It also shows the channel units CH1–4, group unit GU, signal oscillator circuit SO, carrier supply circuit CS, and the carrier and signal rectifier circuits CR and SR;

FIG. 2 illustrates in schematic form the alarm and test circuit of the terminal 1;

FIGS. 3 and 4 illustrate in block and schematic form the terminal 2 equipment. This equipment is the same as that of the terminal 1 as shown in FIGS. 1 and 2;

FIG. 5 illustrates a graph of the typical range and characteristics of the rectified carrier voltages which are used to control the alarm and test circuits; and FIG. 6 illustrates the relative position in which FIGS. 1 to 4 may be placed to show an operative arrangement.

In the accompanying drawings, relay contacts are shown in detached form with an "*x*" indicating a make contact and a vertical bar a break contact. The principles of this type of notation are described in an article entitled "An Improved Detached-Contact-Type of Schematic Circuit Drawing" by F. T. Meyer in the September 1955 publication of the American Institute of Electrical Engineers Transactions, Communications and Electronics, volume 20, pages 505–513.

*System Description*

The carrier system in which this invention is intended to function, by way of example, is essentially the same as that disclosed in the Maurushat Patent 2,986,610. The equipment units of FIGS. 1 and 3 of this application are basically similar to the corresponding figures of the reference patent. New circuits, such as the signal rectifier of FIG. 1, and circuit control paths, such as over lead E2 of FIG. 1, are incorparated into the equipment of FIGS. 1 and 3 as part of the present invention, and for cooperating with the test equipment of this invention which is shown in FIGS. 2 and 4 of the drawing.

*Transmission of Telephone Voice and Supervisory Signals*

As described in the afórementioned Maurushat patent, the equipment units used in the transmission of voice frequency signals are shown in FIGS. 1 and 3. These figures are block diagrams of part of the terminal circuit units. The various circuits of these units are shown in block diagram form because each one is well-known in the art. For example, the signal oscillator circuit SO of FIG. 1 may be similar to the R-C type oscillator disclosed in the United States Patent 2,268,872 issued on January 6, 1942 to W. R. Hewlett; and the hybrid circuit H1 of FIG. 1 may be any of the different versions of four-wire terminating sets, such as, the inductive or resistive types. For this reason, the description of the various circuits shown in block diagrams will be of a general nature and only those details necessary for a clear and complete understanding of the instant invention will be presented.

In the example presently to be described, the transmission of telephone voice and supervisory signals from the telephone system A, over channel 1 of the carrier system, to the telephone system B will be explained. In FIG. 1, the telephone system A is connected to channel 1 of the carrier system over the trunk TK1. The T1 and R1 leads of the trunk TK1 are used for voice transmission and the leads E1 and M1 of the trunk TK1 are used for supervisory signaling. The trunk TK1 terminates in the channel unit CH1 of the carrier system. Telephone voice currents from the telephone system A are coupled over the leads T1 and R1 of the trunk TK1 and enter the unit CH1 at the hybrid circuit H1. The latter circuit has the function of providing a transition from a two-wire to a four-wire path and vice versa for carrying voice currents between the telephone system A and the carrier system. From the hybrid H1, transmitted voice signals pass over the leads T1A and R1A through the low pass filter F1 to the channel modulator CM1 over the leads T1B and R1B. The filter F1 defines a voice frequency band between .3 kc. and 3 kc.

Before proceeding further with the description of the transmission of telephone voice currents through the channel unit CH1, it is appropriate to explain the characteristics of the signal oscillator circuit SO, signal rectifier circuit SR, and the carrier supply circuits CS of FIG. 1. The circuit SO is operative continuously and supplies the 2.6 kc. tone signals to the channel units CH1–4 over leads TS1 and TS2. Regarding channel unit CH1, this tone current is coupled from leads TS1 and TS2 through contacts 1 and 2 of relay MR1 over leads T1B and R1B to the channel modulator CM1. In order to transmit supervisory signals, including dial pulses and the like, in various on-off combinations, relay MR1 is controlled via lead M1 or trunk TK1. Whenever battery potential is applied to lead M1 for this purpose, relay MR1 is operated and its contacts 1 and 2 disconnect the tone current from the modulator CM1. In this manner, local direct current signaling is translated into a form which the carrier system handles just as if it were a telephone voice signal.

Signal rectifier circuit SR of FIG. 1 is designed, in accordance with the present invention, to rectify and filter the 2.6 kc. signal tone generated by the oscillator SO. The rectified and filtered direct-current (D.C.) voltages are used to control the circuits of FIG. 2 over the lead RVA. The magnitude of the D.C. voltages is representative of the output 2.6 kc. signal level from the oscillator SO. The different values thereof, which are available on the lead RVA under normal and abnormal conditions, are described in detail in subsequent paragraphs.

All of the channel and group carrier frequency signals required for the terminal 1 operation are supplied from the carrier supply circuit CS of FIG. 1. Connections of the channel and group modulators and demodulators to the proper carrier signals are made via leads CS1–5, inclusive. The carrier frequency allocation of each channel is shown in the modulator CM1 and demodulator CD1 for channel unit CH1 and in the over-all block diagrams of the channel units CH2–4. The circuit CS generates, 12, 20, 28, and 36 kc. carrier signals for the channel units CH1–4 and 96 kc. carrier signals for the group unit GU. The particular circuit used to derive these signals can employ any one of a number of precision oscillators, such as a crystal controlled oscillator.

Returning now to the previous description concerned with the transmission of signals, it is recalled that both the .3 to 3 kc. telephone voice signals and the 2.6 kc. tone signals may be applied to the modulator CM1 over the leads T1B and R1B. When they are, these signals modulate the 12 kc. carrier supplied to the modulator CM1 from the circuit CS. The modulation product signals of the modulator CM1 include the upper and lower sideband frequencies as well as the 12 kc. carrier frequency. These signals are coupled from the modulator CM1 over the leads T1C and R1C to the bandpass filter TF1 which suppresses the lower sideband and carrier frequency signals and passes the upper sideband signals over the leads TG and RG to the group unit GU. These signals enter the group unit at the group modulator circuit GM and may be combined with the other signals from the channel units CH2–4 to form frequency multiplex signals. The latter signals then modulate the 96 kc. carrier to shift the signals to the line transmission frequencies. The modulated signals are coupled from the modulator GM to the transmit amplifier circuit TA over the leads TGA and RGA. The amplifier TA then performs common amplification of the signals and delivers them to the line TL1 for transmission to the terminal 2.

The signals sent from the terminal 1 over the transmission line TL1 enter the terminal 2 (FIG. 3) at the receive amplifier circuit RA1 of the group unit GU1. The latter circuit serves to amplify the level of the received signal and to automatically compensate for changes in the received signal level with time. For example, as the received signal level decreases, the gain of the amplifier RA1 is automatically increased to compensate for the change. Likewise, when the received signal level increases, the gain of the amplifier RA1 is automatically decreased. The manner in which the gain is regulated is further explained hereinafter in connection with the circuit operations involved in the presence of a trouble condition. The amplified signals from the amplifier RA1 are coupled in parallel to the group carrier rectifier circuit CR1 and to the group demodulator GD1 over the leads TGB1 and RGB1.

Among the received signals amplifed by the circuit RA1 and passed over the leads TGB1 and RGB1 to the circuit CR1 are the received 96 kc. group carrier frequency signals. The latter circuit, in a conventional manner, is arranged to select, rectify, and filter the 96 kc. signals. The resultant filtered, or positive D.C. voltages are used to control the circuits of FIG. 4 over the lead RV1. The magnitude of the D.C. voltages is representative of the received 96 kc. carrier signal level. The different values thereof, which are available on the lead RV1 under normal and abnormal operating conditions, are described hereinafter in greater detail.

The group demodulator GD1 converts the received signals into the individual channel frequencies and then passes the signals to the respective channel units CH5–8. From the demodulator GD1, the received signals for channel 1 are coupled to the bandpass filter RF5 over the leads TGC1 and RGC1 and thence to the channel demodulator CD5 over the leads T1D and R1D. After demodulation by the demodulator CD5, telephone voice signals pass over the leads T1E and R1E through the channel amplifier CA5, low pass filter F5A, over the leads T1F and R1F, and the receive portion of the hybrid H5 to the telephone system B via the leads T5 and R5 of the trunk TK5.

The tone frequencies of the demodulated signals which may appear on the leads T1E and R1E are detected, rectified, and amplified by the tone detector circuit TD5 and are used to control the signaling relay ER5. When prescribed tone signals of sufficient amplitude and duration are detected on the leads T1E and R1E, the circuit TD5 responds and operates the relay ER5. When they are not, relay ER5 is released. The operated or released condition of relay ER5 conveys supervisory signals to the telephone system B. Whenever relay ER5 is operated, its contact 1 removes ground potential from the lead E5 of the trunk TK5. When it is released, ground potential is applied to the lead E5 to operate direct-current signal receiving equipment (not shown) in the telephone system B.

This completes a description of the transmission of telephone voice and supervisory signals from the telephone system A over channel 1 of the carrier system to the telephone system B. The transmission of such signals in the other direction, or over the other channels 2 to 4, inclusive, of the carrier system is accomplished in essentially the same manner as previously described.

*Alarm and Test Circuits*

According to the present invention, the alarm and test facilities of FIGS. 2 and 4 include circuits which monitor the rectified 2.6 kc. voltage produced by the signal rectifier circuits SR and SR1 of FIGS. 1 and 3, respectively; and which monitor the rectified carrier (96 kc.) voltage produced by the carrier rectifier circuits CR and CR1 of FIGS. 1 and 3, respectively. Each of the monitor circuits provides for detecting irregularities in the rectified voltage which indicate failures that interfere with proper telephone service. A failure is detected when the rectified voltage applied to a monitor circuit deviates below a predetermined minimum magnitude.

A monitor circuit provides a positive alarm for the failure of certain equipment units of the carrier system which are common to the four communication channels, as well as for the failure of the transmission facilities.

A timing circuit is included in the alarm facilities at each of the carrier terminals to distinguish between a temporary and a long term transmission failure. The timing circuit cooperates with a monitoring circuit and permits the carrier system to remain in-service if a temporary transmission failure occurs. The latter types of troubles do not seriously impair regular telephone service. An alarm is indicated and equipment is taken out-of-service when a long term or permanent transmission failure occurs.

When either a temporary or a permanent failure occurs in the operation of the signal oscillators SO or SO1, the supervisory signaling over all four communication channels is impaired. Consequently, an alarm is immediately indicated when such a signaling failure occurs, and equipment is immediately taken out-of-service.

The alarm facilities are essentially the same as in the aforementioned Maurushat patent in that they provide for visual and audible alarm indications by lamps and bells. An alarm condition will result in the actuation of relay circuits which interrupt all transmission between the two switching terminals. In addition, these actuated relay circuits provide disconnect and subsequent make-busy signals on the signaling leads of all of the trunks TK1–8 after the carrier system failure. The relay circuits also control a sequence of automatic transmission tests in order to ascertain when the trouble clears and the system can be returned to normal service. If the trouble persists, the carrier system is held out-of-service, the alarms remain activated, and the trunks TK1–8 are held busy. On the other hand, if the transmission tests indicate that the trouble is cleared, the carrier system and the trunks TK1–8 are returned to service, and the alarms are deactivated.

*Normal Supervisory Signaling and Carrier Signal Transmission*

This section describes the monitor circuits of the alarm and test facilities of FIG. 4, and the manner in which each of these circuits cooperates with the associated signal and carrier rectifier circuits SR1 and CR1 of FIG. 3 when the carrier system is operating properly. The other functions of these facilities in detecting trouble conditions, removing circuits from service, testing, retiring alarms, and automatically restoring circuits to service are described in the following section.

The operation of the signaling oscillator SO1 of FIG. 3 is monitored by the signaling alarm relay SM of FIG. 4. This relay has a single two-terminal winding. One terminal thereof is connected to ground potential and the other terminal is connected to the rectified voltage lead RV1A. The nominal value of the D.C. voltage applied to the lead RV1A by the rectifier circuit SR1 during this time is sufficient to operate the relay and to hold it in the operated state. When the relay SM is operated, its contact 1 is actuated to open the operate circuit for the relay A1 of FIG. 4.

As previously explained, during the period in which the carrier system is operating properly, 96 kc. carrier frequency signals are received over the transmission line TL1, are amplified by the receive amplifier circuit RA1 of FIG. 3, and are converted into D.C. voltages by the carrier rectifier circuit CR1 of FIG. 3. The magnitude of this D.C. voltage is representative of the quality of transmission between the terminals 1 and 2. This quality is monitored by the carrier alarm relay CM of FIG. 4. This relay has a single two-terminal winding. One of its terminals is connected to ground potential and the other terminal is connected to the rectified voltage lead RV1. The nominal value of the D.C. voltage applied to the lead RV1 by the rectifier circuit CR1 at this time is illustrated in the graph of FIG. 5 by the designation V1. The typical range and characteristics of the voltages which may be applied to the lead RV1 under the various other operating states of the system are also illustrated in the graph of FIG. 5. These voltages V2–4, and their order of occurrence, are explained in the following section. At the time that the voltage V1 is applied to the lead RV1, the relay CM is operated and held in the operated state to indicate that the transmission from the terminal 1 to the terminal 2 is satisfactory. While relay CM is operated, its contact 1 is actuated to open the operate circuit for the relay DA of FIG. 4.

These circuit conditions prevail in the terminal 1 alarm and test circuits during the time that the carrier system is properly operating. It is noted that the other relays, lamps, bells and the transistor circuit of FIG. 4 are nonoperated at this time under control of the relays SM and CM. The states of the corresponding circuits (FIG. 2) of the terminal 1 at this time are the same as those of the circuits of FIG. 4.

*Carrier System Failure*

A number of trouble conditions, such as the total or partial failure of a transmit or receive amplifier circuit, or a signal oscillator circuit, or certain other equipment which is common to the four communication channels, can cause further operations of the alarm and test circuits. The operations of the latter circuits are essentially the same when either the carrier signal transmission in any direction between the terminals 1 and 2 is seriously impaired or a malfunction occurs in one of the signaling oscillator circuits SO or SO1. The only significant difference in the circuit operations is that, when a signal oscillator trouble occurs, the circuits operate to indicate immediately a signaling alarm condition; whereas, when a transmission failure occurs, the circuits must first operate to measure the period of the failure and to indicate a carrier alarm condition only after the failure persists beyond a prescribed period. The circuits operate in the same manner in response to either type of alarm condition to remove the carrier system from service and to perform automatic transmission tests.

In order to emphasize the similarities and the differences in the alarm and test circuit operations, and to facilitate the understanding of the circuit features, it is initially assumed that a trouble occurs in the transmit amplifier TA of FIG. 1 which interrupts the signal transmission from the terminal 1 to the terminal 2. It is also assumed that the transmitting and receiving circuits at the terminal 2, and the receiving circuits at the terminal 1 are functioning properly, and that channel 1 of the carrier system is being used for telephone voice communication at the time of the trouble occurrence.

When transmission is interrupted at the terminal 1, it is recognized at the terminal 2 by an excessive decrease in the D.C. voltage applied to the lead RV1 for controlling the carrier monitor relay CM. This decrease in voltage is caused by the loss of the 96 kc. carrier signal. Whenever the voltage applied to the lead RV1 by the carrier rectifier circuit CR1 decreases to or below the nominal value V2, as shown in the graph of FIG. 5, a corresponding decrease results in the current flow through the winding of the relay CM and thereby causes it to release.

Upon the release of the relay CM, its contact 1 is deactivated to close the circuit for operating, after a timed interval, the delay alarm relay DA. This circuit extends from ground through contact 1 of relay CM, contact 6 of relay A1, and the winding of relay DA to battery B3. The latter relay is a slow-operate device which is used for timing the period of the transmission failure and for delaying the activation of alarms.

If the trouble in the transmit amplifier TA at the terminal 1 is self-clearing and results only in a temporary transmission interruption which does not seriously affect telephone service, the following circuit operations occur to prevent the operation of relay DA after normal transmission is restored. The receive amplifier circuit RA1 and the carrier rectifier circuit CR1 operate to cause the voltage on the lead RV1 to change from the value of or below V2 to V1, as shown by the interval designated 1 in the graph of FIG. 5. This change in voltage causes an increase in the current through the winding of relay CM and causes it to reoperate. When relay CM reoperates, it actuates its contact 1 and thereby reopens the operate circuit for the relay DA before it has time to be operated.

On the other hand, however, when the trouble in the amplifier TA causes a transmission interruption which interferes with proper telephone communication for an extended period, the following operations occur. After a prescribed delay period following the closure of the DA relay operate circuit, relay DA is operated. Upon the operation of relay DA, ground potential is connected through its contact 1, contact 10 of the relay T, contact 6 of relay M, and the winding of the relay A1 of FIG. 4 to the battery B2 to operate relay A1 which, in turn, initiates other circuit operations for producing alarm indications and for removing the carrier system from service.

Before proceeding with the description of the last-mentioned circuit operations, however, it is advisable at this point to explain the manner in which a trouble condition in a signaling oscillator affects the operation of the alarm and test facilities. Assume now that a trouble has occurred in the oscillator SO1 of FIG. 3 which causes no output 2.6 kc. signal to be generated and applied over the lead TS5 to the signal rectifier SR1. When this occurs, the D.C. voltage applied to the lead RV1A by the rectifier circuit SR1 decreases toward zero and causes the current flow through the winding of the relay SM to decrease, and thereby to effect the release of relay SM. Relay SM releases, and closes ground potential through its contact 1, contact 6 of relay M, and the winding of relay A1 to battery B2 to operate the latter relay. It is noted that the relay A1 is operated under direct control of the relay SM and without an extended time delay as in the case of an inter-terminal transmission failure. This mode of operation is used because, when such a signaling failure occurs, it can cause a number of simultaneous telephone calls to be erroneously originated. For example, assume that carrier channel 1 is in use for telephone voice communication and that channels 2–4 are idle. When no output 2.6 kc. signal is generated by the signal oscillator SO1, the 2.6 kc. signal transmission to the channel units CH1–4 is interruped and, as previously indicated, the leads E2–4 of the trunks TK2–4 are connected to ground potential through the contacts of the relays ER2–4 (not shown) in the channel units CH1–4. The ground signal on the leads E2–4 is usually used to inform equipment (not shown) in the telephone system A that an incoming telephone call has been extended over each of the carrier channels 2–4, and causes this equipment to prepare for the receipt of call directing signals. Since this equipment is being held out-of-productive service as a result of these erroneously originated calls, it is desirable to release the telephone equipment from engagement with the channels 2–4 as quickly as possible. Therefore, as soon as the output 2.6 kc. signal from the oscillator SO1 is impaired beyond a prescribed characteristic, the signal monitor relay SM is released to cause the immediate operation of relay A1 and thereby to effect the release of the telephone office equipment and the removal of the carrier system from service. After the operation of the relay A1 due to an oscillator trouble, the telephone equipment is released and the carrier system is removed from service, tested and returned to service in the same manner as for a transmission trouble condition.

Returning now to the previous discussion concerned with the circuit actions that occur following a transmission failure, it is noted that when the relay A1 operates it closes its contact 5 to complete a locking circuit for itself. Upon the operation of relay A1, the operate circuit for relay DA is opened at the contact 6 of relay A1 to allow the relay DA, if it is operated, to release. This permits the latter relay to recycle after it is operated. The operation of relay A1 also closes a circuit path for operating the relay ALM of FIG. 4. The path for operating relay ALM is from ground potential through the contact 3 of relay A1 and the winding of relay ALM to battery B3.

The operation of relay ALM closes paths for operating the trouble record relay TR and for activating the audible and visual alarms AUD and VIS of FIG. 4. The operate path for relay TR is from ground potential through contact 1 of relay ALM and the winding of the relay TR to battery B3. Upon operating, relay TR locks operated through its contact 1 and contact 1 of the trouble record erase key TRE to ground potential. Relay TR then remains operated until the key TRE is manually operated. Relay TR also closes a path for energizing the trouble lamp TBL; this path being from ground potential through the contact 2 of relay TR and the resistance of the lamp TBL to battery B4. The audible and visual alarms AUD and VIS are activated under control of contact 2 of relay ALM. These alarms alert the maintenance personnel of the alarm condition and the lamp TBL indicates the particular equipment affected. No effort is required of the maintenance personnel at this time because the automatic transmission tests will be momentarily started.

When relay A1 operates, its contacts 7 to 11, inclusive, (contacts 8 to 10 of channel units CH6–8 are not shown) are operated to open the leads CS6–10 between the carrier supply circuits CSC and the channel and group modulator circuits. This disconnects the various carrier frequency signals from the latter circuits and interrupts transmission from the terminal 2 to the terminal 1. The interruption, as hereinafter discussed, causes the operation of the alarm and test circuits at the terminal 1. The operation of relay A1 also gives an indication of the circuit progress and of the disconnection of the various carrier frequency signals by energizing the carrier lamp CAR. The circuit for controlling lamp CAR is from ground potential through contact 2 of relay A1 and the lamp resistance to battery B4.

Upon operating, relay A1 also completes a path for operating the relay A2 of FIG. 4. This path is from ground potential through contact 1 of relay A1 and the winding of relay A2 to the battery B2. Relay A2 operates and then locks operated under control of the ground potential supplied through contact 1 of the relay ER5 in the channel unit CH5, over the lead E5 of the trunk TK5, and contact 12 of relay A2 to the winding of relay A2. Relay ER5 and the relays ER6–8 (not shown) of the channel units CH6–8 are released at this time because the 2.6 kc. tone signals which control the tone detector circuits TD5–8 are absent due to the transmission failure. When relay A2 operates, it opens the leads E5–8 of the trunks TD5–8 between the telephone system B and the carrier system. The lead E5 of the trunk TK5 is opened at contact 2 of relay A2 and disconnects ground potential therefrom toward the telephone system B for signaling the equipment (not shown) of the telephone office B to disconnect circuits extending between the telephone user and trunk TK5. Alternate telephone service for that telephone user is then provided for in the well-known manner. The opening of the leads E6–8 disconnects ground therefrom and signals the equipment (not shown) in the telephone system B which is connected to the trunks TK6–8 to release. Subsequently, as explained hereinafter, all of the trunks TK5–8 are made busy. When relay A2 is operated, it closes a path for energizing the signal lamp SIG to give an indication of the progress of the alarm and test circuit operation. This path is from ground potential through contact 3 of relay A2 and the resistance of lamp SIG to battery B4.

An operate path is closed for the relay M of FIG. 4 upon the previously described operation of relay A2. This path extends from ground through contact 1 of relay A2 and the winding of relay M to battery B2. Upon operating, relay M actuates its contacts 2 to 5 for opening the connections over the leads M5–8 between the telephone system B and the channel units CH5–8 to prevent supervisory signals from being sent over the channels. The operation of relay M also closes a locking circuit for relay A1, which extends from ground through contact 1 of the signaling check relay SC of FIG. 4 and contact 1 of relay M to the M relay winding. Subsequently, the original operate path for relay A1 is opened at the M relay contact 6.

A locking path for relay ALM is closed upon the operation of relay A2. The path extends from ground through contact 4 of relay A2, contact 1 of the alarm cut-off key ACO and contact 3 of relay ALM. Relay ALM then remains operated until either the key ACO is manually operated or relay A2 is released, as hereinafter described, following a successful transmission test.

When relay A2 operates, it also closes a path over the lead M5 of trunk TK5 for operating the relay MR5 of the channel unit CH5. This path is from battery 11 through contact 4 of relay A1, contact 7 of relay A2, and the winding of relay MR5 to ground potential. Relay MR5 operates and thereby opens its contacts 1 and 2 to disconnect the 2.6 kc. tone signals from the associated channel modulator CM5.

Following the operation of relay A2, a path is closed for operating the delay test relay DT of FIG. 4. This path is from ground potential through contact 5 of relay A2, contact 1 of relay T, and the winding of relay DT to battery B2. Relay DT is a slow acting device which, as hereinafter described, delays the automatic transmission test for a timed interval within which the equipments at the terminals 1 and 2 are removed from service.

Turning now to the circuits of the terminal 1 of FIGS. 1 and 2, the cessation of transmission from the terminal 2 to the terminal 1 over the transmission line TL2 upon the operation of the relay A1 causes the alarm and test circuits of FIG. 2 to operate to detect an alarm condition. The operations involved in detecting the alarm condition, disconnecting and busying the equipment (not shown) of the telephone system 1, and preparing the carrier circuits for the automatic transmission test are the same as the hereinbefore explained operations of the terminal 2 circuits. In view of this identical operation of the circuits of FIGS. 2 and 4, it is now assumed that the terminal 1 circuits have been removed from service in the same manner as the terminal 2 circuits. The condition of the various circuits of the terminal 1 at this point may be summarized as follows:

The operated relays are A3 (equivalent of A1 in FIG. 4), A4 (equivalent of A2 in FIG. 4), ALM1, M1, MR1, SM1, and TR1. The released relays are CM1, DA1, DT1, SCA, and T1. Audible and visual alarms AUD1 and VIS1 are actuated, and the lamps TBL1, SIG1, and CAR1 are energized. In addition, a circuit path is completed for operating the slow-operate delay test relay DT1 of FIG. 2. This circuit extends from ground through contact 5 of relay A4, contact 1 of relay T1 and the winding of relay DT1 to battery B6.

Returning now to the previous discussion, it will be recalled that following the operation of relay A2, a path was closed for operating relay DT of FIG. 4. The latter relay is operated after an appropriate time delay to close a path for operating relay T of FIG. 4 and thereby to start the automatic transmission test. This path extends from ground through contact 1 of relay DT and the winding of relay T to battery B2. Relay T operates and locks operated through its own contact 2 and contact 5 of relay A2 to ground. It also opens the operate path for relay DT at its contact 1 and thereby causes it to release. Upon operating, relay T completes a circuit for operating the relay BE of FIG. 4. This circuit extends from ground through contact 9 of relay T and contact 2 and the winding of relay BE to battery B3. When relay BE operates, it locks operated through its own contact 1 and contact 11 of relay A2 to ground. Ground potential is applied to the leads E5–8 of the trunks TK5–8 as shown in FIG. 3 under control of contacts 3–6 of the operated relay BE for making the trunks appear busy at the telephone system B. For example, ground potential is applied to the lead E5 of trunk TK5 via contact 3 of relay BE and contact 6 of relay A2.

The operation of relay T also actuates its contacts 4–8 (contacts 5–7 of channel units CH6–8 are not shown) to reclose the leads CS6–10 which connect the carrier supply circuit CSC to the various channel and group modulator circuits of FIG. 3, and thereby reapplies the carrier frequency signals to the latter circuits. As a result, the 96 kc. carrier frequency signals and the 2.6 kc. tone signals are then processed through the terminal 2 over channels 2 to 4, in a manner as hereinbefore discussed, and are transmitted (over the transmission line TL2) to the terminal 1. It is noted that, if a trouble condition was present at this point in the oscillator SO1 of FIG. 3 which caused no 2.6 kc. output signal to be available for signaling purposes, 96 kc. signals alone would be sent to the terminal 1 until the trouble was corrected.

At the terminal 1, the received 96 kc. signals cause the receive amplifier circuit RA and the carrier rectifier circuit CR to return to normal operation, as previously explained, and, in turn to cause the D.C. voltage on the lead RV to rise from the value near V2 to V1 as shown in the graph of FIG. 5. The latter change is approximately as shown in the graph of FIG. 5 by the interval designated 1. This voltage change causes the reoperation of the relay CM1.

A short time thereafter, the delay test relay DT1 of FIG. 2 is operated under control of relay A4 to initiate testing from the terminal 1. When relay DT1 operates, it completes the circuit from ground through its contact 1 and the winding of relay T1 to operate the latter relay which then locks operated through its contact 2. Upon operating, relay T1 opens at its contact 1 the operate circuit for relay DT1 and causes it to release. The operation of relay T1 also closes the circuit extending from ground through its contact 9 and contact 2 and the winding of relay BE1 to battery B7 to operate the latter relay. Relay BE1, upon operating, closes its contacts 3–6 for applying ground potential to the leads E1–4 of the trunks TK1–4 to make these trunks appear busy to the telephone system A. When relay T1 operates, it also closes its contacts 4–8 (contacts 5–7 of channel units 2–4 are not shown) for reapplying carrier frequency signals from the circuit CS of FIG. 1 to the channel and group modulator circuits of FIG. 1. Upon the reapplication of these carrier signals, 2.6 kc. tone signals are immediately processed over channels 2 to 4 to the transmit amplifier TA for transmission over the line TL1 to the terminal B as soon as the trouble condition in the circuit TA is corrected.

When the 2.6 kc. tone signals are transmitted, as previously stated, from the terminal 2 to the terminal 1 over the channels 2 to 4, they cause the immediate operation of the relays ER2–4 in the channel units CH2–4. Upon operating, these relays actuate their respective contacts to cause a ground potential to be removed from the leads E2–4 of the trunks TK2–4 in the same manner as when relay ER1 of channel unit CH1 operates its contact 1 to remove ground potential from lead E1 of trunk TK1. Each of the leads E2–4, however, still have a ground applied thereto under control of the contacts of relays A4 and BE1 to make the trunks appear busy to the telephone system A. When the ground is removed from the E2 lead under control of relay ER2 (not shown), the circuit comprising the transistor TR2 is activated to check whether relay ER2 was operated as the result of valid 2.6 kc. tone signals or as the result of transient noise and cross-talk signals simulating 2.6 kc. tone signals.

Before proceeding with a description of the manner in which the check circuit of FIG. 2 distinguishes between valid and simulated 2.6 kc. tone signals, it is advisable to first explain the general characteristics of the circuit. This circuit is used to generate a timed interval against which the duration of the 2.6 kc. tone signals are measured. It includes the transistor TR2 which is biased normally at cutoff. Emitter bias for transistor TR2 is derived from a circuit extending from battery B5 through the resistors R6 and R5 to ground. When relay A4 is released, the base electrode reverse bias is supplied from ground through the A4 relay contact 10 and resistor R7. Under these conditions, the potential developed across the timing capacitor C1 is very small. The collector electrode of the transistor is connected in series with the winding of the signal check relay SCA and the resistor R8 to battery B10.

Returning now to the previous discussion concerned with the operation of the check circuit, it is noted that, when the relay ER2 (not shown) is released during the transmission test, ground potential is connected through contact 1 (not shown) of relay ER2 (not shown), lead E2, contact 9 of relay A4, and resistor R7 to the base electrode of the transistor TR2 to maintain it in the nonconducting state. However, when relay ER2 (not shown) is operated, its contact 1 (not shown) is actuated to disconnect the ground from the transistor base electrode for starting the timing operation. After this ground is disconnected, the timing capacitor C1 charges from battery B13 through resistors R9 and R7 and the capacitor C1 to ground. The charging current through resistors R7 and R9 produces an exponential voltage which is, for a predetermined interval, in opposition to forward biasing the emitter-to-base junction of transistor TR2. Relay ER2 (not shown) may be released prior to the completion of the timing interval when its operation was caused by transient noise or crosstalk simulating the 2.6 kc. tone signal. After it is so released, its contact 1 recloses a path for stopping the timing operation and for discharging the capacitor C1. This path extends from ground through the ER2 relay contact 1 (not shown), contact 9 of relay A4, and the resistor R7. On the other hand, if the operation of relay ER2 (not shown) was caused by a valid 2.6 kc. tone signal, as in the case of the previously assumed conditions, the emitter-to-base junction of transistor TR2 is forward biased when the voltage developed across the capacitor C1 and at the transistor base electrode is more negative than the emitter bias voltage. Thereupon, collector current is drawn from battery B10 through the resistor R8, the winding of relay SCA, the collector-to-emitter resistance, and resistor R5 to ground; and it causes relay SCA to operate and thereby actuate its contact 1 to open the locking circuit for relay A3.

Relay A3 then releases and opens at its contact 3 the circuit path through the lamp CAR1 for causing the lamp to extinguish, and thereby to indicate to the maintenance personnel the test progress. The operation of relay A3 also opens at its contact 4 the operate circuit for relay MR1. Thereupon, relay MR1 releases and recloses its contacts 1 and 2 to cause the 2.6 kc. tone signals to be reapplied to the channel modulator CM1. The latter signals may be then processed through the terminal 1 circuits to the amplifier TA of FIG. 2 for transmission over the line TL1 when the asumed truoble condition in that amplifier is corrected.

If the asumed trouble in the amplifier TA persists and continues to interfere with the carrier signal transmission to the terminal 2, the gain of the receive amplifier circuit RA1 of FIG. 3 is automatically increased under control of a regulator (not shown) within the circuit RA1. As this occurs, extraneous signals, such as noise and crosstalk, which may be present at low levels on the line TL1 are amplified by circuit RA1 and are coupled to the carrier rectifier circuit CR1. The latter circuit selects, rectifies and filters certain components of these signals which simulate the 96 kc. carrier signal, and causes a positive increase in the D.C. voltage applied to the lead RV1. The increase in voltage is indicated in the graph of FIG. 5 by the interval designated 3. This positive voltage change is normally delayed, and occurs over a prescribed interval after the transmission interruption and following the removal of the carrier system from service. As indicated in the graph, the voltage may change from a value near V2 to V3 as the gain of circuit RA1 is increased toward maximum. When the voltage on lead RV1, in rising toward V3, is slightly less positive than V1, relay CM is reoperated. The operation of relay CM at this time, however, does not affect any other circuit operations. Relay CM thereafter remains operated following the restoration of transmission between terminals for again monitoring the operation of the carrier system.

When the gain of the amplifier RA1 is increased toward its maximum value, transient noise or crosstalk signals simulating 2.6 kc. supervisory signals may be received by the tone detector circuits TD5–8 (not shown) of the channel units CH5–8 and cause the intermittent operation of the associated relays ER5–8 (not shown) of the channel units CH5–8; however, the check circuit comprising the transistor TR1 of FIG. 4 prevents these relay operations from erroneously advancing the operations of the test circuits of FIG. 4. This check circuit operates in the same manner as the previously described check circuit of FIG. 2 to cause the operation of the signal check relay SC and the advance of the testing circuit operation only when valid 2.6 kc. signals are received by the tone detector TD6 of FIG. 3.

In the case where the trouble condition in the amplifier TA of FIG. 1 is self-clearing and signal transmission is restored over the line TL1 before the operation of the relay SCA of FIG. 2, 2.6 kc. tone signals are transmitted from the terminal 1 to the terminal 2 over the channels 2 to 4. These signals are processed through the terminal 2 circuits, in a manner as herebefore explained, and cause the operation of the relays ER6–8 (not shown). Upon operating, these relays actuate their respective contacts to remove a ground potential from the trunk leads E6–8. The latter leads as well as lead E5 are, however, still grounded via the contacts of relays A2 and BE to make the trunks appear busy to the telephone system B. After the relay ER6 (not shown) is activated, the check circuit comprising the transistor TR1 of FIG. 4 is operated to check the validity of the signals causing the activation of relay ER6 (not shown). After a predetermined timing period, the relay SC in the check circuit is operated, in a similar manner as previously explained with respect to the relay SCA of FIG. 2, for causing the release of the relay A1.

Before the release of relay A1 is effected, and after the operation of relay SCA of FIG. 2 causes the aforementioned release of relay MR1 and thereby the reapplication of 2.6 kc. signals to the channel modulator CM1, 2.6 kc. signals are transmitted over channel 1 to the terminal 2 to cause the operation of the relay ER5 of the channel unit CH5. The ER5 relay operation activates its contact 1 for opening the locking circuit for relay A2; however, relay A2 remains operated under control of contact 1 of relay A1.

Upon the previously mentioned release of relay A1, its contact 2 is actuated to open the circuit path through lamp CAR and thereby to cause that lamp to extinguish. The A1 relay release action also opens, at its contact 4, the present operate circuit for relay MR5 and causes it to release and thereby to actuate its contacts 1 and 2 to reapply 2.6 kc. signals to the channel modulator CM5. The latter signals are then processed over channel 1, in a manner as previously explained, to cause the operation of relay ER1 in the channel unit CH1.

When relay A1 releases, its contact 1 is also actuated to open the operate circuit for relay A2 and causes it to release. The release of relay A2 actuates its contacts to remove the make busy ground potential from the trunk leads E5–8; and to open the path through lamp SIG, the locking paths for the relays ALM, BE and T, and the operate path for the relay M. Lamp SIG then extinguishes to indicate the test progress. Relay ALM also releases and opens its contact 2 to deactivate the alarms AUD and VIS. When the operate circuit for relay M is opened, it releases and actuates its contacts 2 to 5 for reclosing the trunk leads M5–8 between the carrier system and the telephone system B, and thereby allow a resumption of supervisory signaling between the terminals. Thereafter, the key TRE of FIG. 4 may be momentarily operated to open at its contact 1 the operate circuit for relay TR and thereby cause its release. Relay TR, in turn, opens the path through the lamp TBL and causes it to extinguish. This completes the restoration of the terminal 2 equipment to service.

When the relay ER1 at the terminal 1 is operated, as previously explained, it causes the locking circuit for relay A4 to be opened at its contact 1 and thereby causes relay A4 to release. The release of relay A4 causes its contacts to reclose the leads E1–4 between the carrier system and the telephone system A; and also to open the path through lamp SIG1, the locking paths for the relays ALM1, BE1 and T1, and the operate path for relay M1. Lamp SIG1 extinguishes to indicate the test progress. Relay ALM1 releases and opens its contact 2 to deactivate the alarms AUD1 and VIS1. Key TRE1 may then be manually operated to cause the release of the relay TR1 which in turn causes the lamp TBL1 to be extinguished. The restoration of the terminal 1 equipment to service is thus completed shortly after the restoration of the terminal 2 equipment.

It is to be understood that the above-described arrangements are illustrative of the application of the principles of the invention. In light of this teaching, it is apparent that numerous other arrangements may be devised by those skilled in the art without departing from the spirit and scope of the invention.

What is claimed is:

1. In combination, a first and a second communication terminal, means for transmitting communication signals from said first to said second terminal, means at said first terminal responsive to a degradation in the transmission of a predetermined one of said signals for immediately indicating an alarm condition, means at each of said terminals operable independently in response to said alarm condition for concurrently transmitting test signals in each direction between said terminals, and means responsive to the satisfactory reception of said test signals at each of said terminals for cancelling said alarm condition.

2. The combination set forth in claim 1 further comprising auxiliary means responsive to the reception at said second terminal of a communication signal deviating from a predetermined characteristic for indicating an alarm condition, means at each of said terminals controlled by said auxiliary means for generating a timed interval against which the period of said deviation is measured, and wherein said test signal transmitting means at each terminal is controllable by the generating means at the same terminal for effecting the concurrent transmission of the test signals in each direction between said terminals when the period of said deviation exceeds said timed interval.

3. The combination set forth in claim 1 further comprising means responsive to an alarm condition for interrupting the transmission of said communication signals, means at each of said terminals for generating a timed interval against which the period of said interruption is measured, means at each of said terminals activated by the generating means at the same terminal for controlling said test signal transmitting means to initiate test signal transmission when the period of said interruption exceeds said interruption timing interval, and means responsive to the cancellation of said alarm condition for restoring said communication signal transmission.

4. In combination, a first and a second communication terminal, means for transmitting communication signals in each direction therebetween, means for interrupting said transmission in each direction when transmission in one of the directions is impaired, means at each of said terminals operable independently subsequent to said interruption for initiating the concurrent transmission of test signals in each direction between said terminals, said initiating means at each terminal comprising means for generating a timed interval against which the period of the transmission interruption is measured and means controllable by said generating means for immediately effecting the transmission of test signals from that terminal at the end of said timed interval, and means responsive to the reception of said test signals at each terminal for restoring said communication signal transmission.

5. In combination, a first and a second communication terminal, means for transmitting communication signals in each direction therebetween, means responsive to an interruption in said signal transmission to said first terminal for interrupting said signal transmission to said second terminal, means for generating a first timing interval against which the period of said transmission interruption to said first terminal is measured, means for generating a second timing interval against which the period of said transmission interruption to said second terminal is measured, means at said first terminal controlled by said first timing means at the end of said first timing interval for transmitting first test signals to said second terminal, means at said second terminal controlled solely by said second timing means for initiating the transmission of second test signals to said first terminal at the end of said second timing interval, and means responsive to the satisfactory reception of said test signals at each terminal for restoring said communication signal transmission.

6. The combination set forth in claim 5 wherein said restoring means comprises means at said second terminal responsive to the satisfactory reception of said first test signals for transmitting third test signals to said first terminal, means for checking the validity of the third test signals received at said first terminal, means at said first terminal activated by said checking means upon the satisfactory reception of valid third test signals for transmitting fourth test signals to said second terminal, means at said first terminal controlled by said fourth signal transmitting means for restoring said normal signal transmission to said second terminal subsequent to said transmission of said fourth test signals, means for checking the validity of the fourth test signals received at said second terminal, and means at said second terminal activated by said last-mentioned checking means upon the satisfactory reception of valid fourth test signals for restoring said normal signal transmission to said first terminal.

7. In a communication system having a first and a second terminal, first means for transmitting communication signals in each direction between said terminals, second means at said first terminal responsive to the reception of a communication signal deviating from a predetermined characteristic for generating a first timed interval against which the period of said deviation is measured, third means at said first terminal operable under control of said second means when the period of said signal deviation exceeds said first timed interval for interrupting said transmission to said second terminal, fourth means at said second terminal responsive to said interruption for generating a second timed interval against which the period of said interruption is measured, fifth means at said second terminal operable under control of said fourth means when the period of said interruption exceeds said second timed interval for interrupting said transmission to said first terminal, sixth means at said second terminal controlled by said fifth means at the end of said second timed interval for generating a third timed interval, means at each of said terminals operable immediately at the end of said third timed interval for transmitting test signals in each direction between said terminals, and means responsive to the satisfactory reception of said test signals at each terminal for restoring said communication signal transmission in each direction.

8. In a communication system in accordance with claim 7 the combination further comprising means controlled by said second means at the end of said first timed interval for generating a timed interval against which the period of said interruption in transmission to said second terminal is measured, and wherein said test signal transmitting means comprises means at said first terminal responsive at the end of said last-mentioned timed interval for transmitting first test signals to said second terminal, and means at said second terminal responsive at the end of said third timed interval for initiating the transmission of second test signals to said first terminal.

9. In a communication system in accordance with claim 8 the combination wherein said restoring means comprises means responsive to the satisfactory reception of said first test signals at said second terminal for transmitting third test signals to said first terminal to effect the restoration of said communication signal transmission to said second terminal, means responsive to the satisfactory reception of said second test signals at said first terminal for transmitting fourth test signals to said second terminal to effect the restoration of said communication signal transmission to said first terminal, and means at said terminals for delaying the restoration of said communication signal transmission in each direction until after said fourth test signals are satisfactorily received at said first terminal.

10. In a communication system having a first and a second terminal, means for transmitting signals for communication purposes from said first to said second terminal, means at said second terminal for detecting the reception of communication signals deviating from a predetermined characteristic, means at said second terminal controlled by said detecting means upon the detection of signals deviating from said characteristic for generating a first timed interval against which the period of said deviation is measured, means controllable by said timing means when the period of said deviation exceeds said timing interval for indicating a first alarm condition, means at said first terminal responsive to said alarm condition for generating a second timing interval against which the period of said condition is measured, means at said first terminal responsive at the end of said second timing interval for indicating a second alarm condition, means at said first terminal responsive to said second alarm condition for interrupting said transmission to said second terminal, means at said second terminal for generating a first time delay interval following said first alarm condition, means at said first terminal for generating a second time delay interval following said second alarm condition, means at said second terminal responsive at the end of said first delay interval for transmitting first test signals to said first terminal, means at said first terminal responsive at the end of said second delay interval for transmitting second test signals to said second terminal, and means responsive to the satisfactory reception of said test signals at each terminal for cancelling said first and second alarm conditions.

11. In a communication system in accordance with claim 10 the combination wherein said cancelling means comprises means at each terminal for detecting the reception of said test signals, and means at each terminal controlled by said detecting means for delaying the cancellation of one of said alarm conditions until after said test signals have been satisfactorily received for a predetermined interval.

12. In a communication system in accordance with claim 10 the combination further comprising means at said second terminal responsive to the cancellation of said first alarm condition for transmitting third test signals to said first terminal, and means responsive to the cancellation of said second alarm condition and to the satisfactory reception of said third test signals at said first terminal for restoring said communication signal transmission.

13. In a communication system having a first and a second terminal, means for transmitting communication signals in each direction therebetween, means at said first terminal for detecting the reception of communication signals deviating from a predetermined characteristic, means at said first terminal controllable by said detecting means upon the detection of signals deviating from said characteristic for generating a first timing interval against which the period of said signal deviation is measured, means at said first terminal operable at the end of said timing interval for indicating a first alarm condition, means at said first terminal responsive to said alarm condition for interrupting the signal transmission to said second terminal, means at said second terminal for detecting said interruption, means at said second terminal controllable by said interruption detecting means for generating a second timing interval against which the period of said interruption is measured, means at said second terminal controllable at the end of said second timing interval for indicating a second alarm condition, means at said second terminal operable subsequent to said second alarm condition for interrupting said signal transmission to said first terminal, means at each of said terminals operable independently subsequent to said transmission interruptions for transmitting test signals in each direction between said terminals, said test signal transmitting means comprising means at said first terminal for generating a first timed delay interval following said first alarm condition, means at said second terminal for generating a second timed delay interval following said second alarm condition, means at said first terminal for immediately initiating the transmission of test signals to said second terminal at the end of said first delay interval and means at said second terminal for immediately initiating the transmission of test signals to said first terminal at the end of said second delay interval, means responsive to the satisfactory reception of said test signals at each terminal for canceling said alarm conditions, and means responsive to the cancellation of said alarm conditions for restoring said communication signal transmission in each direction between said terminals.

14. In a communication system in accordance with claim 13 the combination wherein said delay generating means at each terminal comprises an electromechanical time delay arrangement.

15. In a communication system in accordance with claim 14 the combination wherein said electromechanical time delay arrangement comprises a relay time delay circuit.

16. In a communication system in accordance with claim 15 the combination wherein said relay time delay circuit comprises at least one slow-acting relay.

17. In a carrier communication system having a first and a second terminal, means for transmitting carrier signals for communication purposes in each direction between said terminals, first means at said first terminal for detecting the reception of carrier signals deviating from a predetermined characteristic, second means at said first terminal controllable by said detecting means upon the detection of signals deviating from said characteristic for generating a first timing interval against which the period of said signal deviation is measured, third means at said first terminal for detecting the transmission of carrier signals deviating from a predetermined characteristic, fourth means at said first terminal selectively operable under control of said second means at the end of said timing interval and under control of said third means after the detection of the transmission of signals deviating from said predetermined characteristic for indicating an alarm condition, fifth means at said first terminal responsive to said alarm condition for interrupting said transmission to said second terminal, sixth means at said second terminal for detecting said interruption, seventh means at said second terminal controllable by said sixth means subsequent to said interruption for generating a second timing interval against which the period of said interruption is measured, eighth means at said second terminal controllable by said seventh means when the period of said interruption exceeds said second timing interval for indicating a second alarm condition, ninth means at said second terminal operable in response to said second alarm condition for interrupting said signal transmission to said first terminal, tenth means at said first terminal responsive to said first alarm condition for generating a first timed delay interval, eleventh means at said first terminal responsive at the end of said delay interval for transmitting first test signals to said second terminal, twelfth means at said second terminal responsive to said second alarm condition for generating a second timed delay interval, thirteenth means at said second terminal responsive to the end of said second delay interval for transmitting second test signals to said first terminal, and means responsive to the satisfactory reception of said test signals at each terminal for restoring said carrier signal transmission in each direction between said terminals.

18. In a carrier communication system in accordance with claim 17 the combination wherein said restoring means comprises means for detecting the satisfactory reception of said first test signals at said second terminal, means at said second terminal to check for the satisfactory reception of said test signals for a predetermined timed interval, means at said second terminal responsive at the end of said check interval for transmitting third test signals to said first terminal, means responsive to the satisfactory reception of said second and third test signals at said first terminal, means at said first terminal to check for the satisfactory reception of said second test signals for a predetermined timed interval, means at said first terminal responsive at the end of said last-mentioned timed interval for transmitting fourth test signals to said second terminal, and means responsive subsequent to the satisfactory reception of said fourth test signals at said second terminal for restoring said carrier signal transmission in each direction between said terminals.

References Cited in the file of this patent

UNITED STATES PATENTS 2,986,610 Maurushat -------------- May 30, 1961